United States Patent [19]

Okuno et al.

[11] Patent Number: 5,520,719
[45] Date of Patent: May 28, 1996

[54] PROCESS FOR PRODUCING SINTERED IRON ORE PRODUCT

[75] Inventors: Yoshio Okuno; Masami Fujimoto, both of Futtsu, Japan

[73] Assignee: Nippon Steel Corporation, Tokyo, Japan

[21] Appl. No.: 232,179

[22] PCT Filed: Aug. 31, 1993

[86] PCT No.: PCT/JP93/01230

§ 371 Date: Apr. 29, 1994

§ 102(e) Date: Apr. 29, 1994

[87] PCT Pub. No.: WO94/05817

PCT Pub. Date: Mar. 17, 1994

[30] Foreign Application Priority Data

| Aug. 31, 1992 | [JP] | Japan | 4-253615 |
| Nov. 24, 1992 | [JP] | Japan | 4-313574 |
| Dec. 28, 1992 | [JP] | Japan | 4-358592 |
| Dec. 28, 1992 | [JP] | Japan | 4-358593 |

[51] Int. Cl.$^6$ ............................... C22B 1/20
[52] U.S. Cl. ............... 75/758; 75/759; 75/769; 75/316
[58] Field of Search ............... 75/316, 758, 769, 75/472

[56] References Cited

U.S. PATENT DOCUMENTS

| 2,248,180 | 7/1941 | Moriarty | 75/769 |
| 3,647,417 | 3/1972 | Wetzel et al. | 75/758 |

FOREIGN PATENT DOCUMENTS

| A52-53704 | 4/1977 | Japan. | |
| B1 43-17043 | 7/1978 | Japan. | |
| A57-73135 | 5/1982 | Japan. | |
| 73135 | 5/1982 | Japan | 75/769 |
| A61-99635 | 5/1986 | Japan. | |
| A63-274723 | 11/1988 | Japan. | |

OTHER PUBLICATIONS

Aspects of sintering process with use of millscale from rolling mills in mix, Yu. G. Efimenko, et al., Apr. 16, 1986, vol. 16, No. 4, London, Great Britain, pp. 161–163 *Steel in USSR*.

*Primary Examiner*—Melvyn Andrews
*Attorney, Agent, or Firm*—Kenyon & Kenyon

[57] ABSTRACT

The present invention relates to a method for sintering an iron scrap in a process for producing a sintered ore which is used as a raw material in ironmaking in a blast furnace. Zn contained in the iron scrap is removed in the step of sintering to enable a light-weight iron scrap to be used in a large quantity in the blast furnace and, at the same time, to enhance the yield of sintered ore in the step of sintering.

In the production of a sintered ore as a raw material for use in a blast furnace by using a Dweight-Lloyd sintering machine, a mixture obtained by mixing a fine debris of an iron scrap with a raw material for a sintered ore is placed on a pallet to produce a scrap-bearing sintered ore. The mixture may be incorporated in a packed bed in its entirety, in its upper bed alone or in its lower bed alone. The iron scrap is fixed to the sintered ore and used as a material for use in a blast furnace.

Further, the amount of coke used as a heat source can be reduced, which contributes a reduction in occurrence of $CO_2$ and $NO_2$ derived from combustion of coke.

7 Claims, 10 Drawing Sheets

PROCESS FOR PRODUCING SINTERED IRON ORE PRODUCT

TECHNICAL FIELD

The present invention relates to a process for producing a sintered ore for use as a raw material for the production of molten metal in a blast furnace and the like and particularly to a process for producing a sintered ore which enables recovered iron scrap to be reused as a raw material for iron in a blast furnace.

PRIOR ART

In recent years, a large quantity of an iron scrap called light-weight debris derived from automobiles, domestic electric appliances, vessels, etc. (hereinafter referred to simply as "scrap") has become available, which has led to an ever-increasing demand for the utilization thereof. This type of scrap is chipped into smaller debris by a shredder or a cutter. However, the debris is still so bulky that it is unwelcome for use in an electric furnace, a converter or the like. Consequently, at the present time, in many cases, large scrap, having a good quality called "heavy debris", is used in an electric furnace, converter, etc. In the past, tests for direct use of light-weight debris in a blast furnace have been carried out. However, there occurred significant problems including separation from ore and segregation, breaking of a transport conveyor belt and clogging of a charge device occur and, in a blast furnace, classification and segregation occurring in an accumulated ore bed, so that it is difficult to steadily use the heavy scrap without disturbing the operation of the blast furnace. If the light-weight iron scrap, which has been chipped, could be charged in a lump form into a blast furnace, a reducing furnace or the like as in the ore or sintered ore, the above-described problems associated with use in a blast furnace can be eliminated. However, no lumping method has hitherto been disclosed.

On the other hand, when scrap derived from galvanized steel sheets which occurs in a relatively large quantity, as such, is used in a blast furnace, fumy dust of ZnO occur in the blast furnace and accumulate on the surface of the furnace wall to form a deposit. For this reason, at the present time, the amount of zinc derived from ores and coke is limited to not more than about 0.2 kg/t-pig. For this reason, no attempt to directly use zinc-containing scrap in a high proportion in a blast furnace has been made in the art.

A schematic flow diagram of the conventional process for producing a sintered ore is shown in FIG. 1(a).

An ore as a main raw material, lime as an auxiliary material, coke as a fuel and return fines are taken off in respective amounts respectively from an ore hopper 1, a lime hopper 3, a coke hopper 2 and a return fine hopper (not shown), and water, for example, in an amount of 6.8% is added thereto in a granulator 4, and humidity conditioning granulation is effected to form a sintering material.

The sintering material containing 3.8% of coke is once charged into a raw material surge hopper 5, taken off from a drum feeder 6, charged through a chute 7 into a pallet 8 to form a packed bed 9. The thickness of the packed bed is 550 mm.

The coke on the surface bed portion of the packed bed is ignited in an ignition furnace 10 and burned while sucking the air downward to successively sinter the raw material from the upper bed towards the lower bed by taking advantage of the heat of combustion.

Further, there is a method wherein anthracite, which is more inexpensive than coke, is used instead of the coke.

Further, Japanese Unexamined Patent Publication (Kokai) No. 99635/1986 discloses a method wherein coke is dried to lower the water content of coke, thereby reducing the amount of coke used.

Further, Japanese Unexamined Patent Publication (Kokai) No. 274723/1988 proposes a method in which heat generated by prereduced iron having a high percentage metallization is utilized for sintering.

The prior art methods had problems including that use of coke as a heat source causes combustion of the coke to generate $CO_2$ and $NO_2$ which are unfavorable from the environmental viewpoint and the grain size of the sintering material is so small that the density of the packed bed becomes large to cause inhibition of air permeation which prolongs the sintering time to unfavorably lower the productivity.

On the other hand, the method in which anthracite is used instead of coke can reduce the occurrence of $NO_2$ but cannot suppress the occurrence of $CO_2$. Further, the reserve of anthracite is so small that this method has problems including the difficulty of ensuring a sufficient amount of anthracite.

In the method disclosed in Japanese Unexamined Patent Publication (Kokai) No. 61-99635, there is a limitation on the reduction in amount of coke used, so that there are problems including that the occurrence of $CO_2$ and $NO_2$ cannot be prevented and an improvement in productivity is small.

In the method disclosed in Japanese Unexamined Patent No. 63-274723, heat is generated in transport for utilization in sintering to bring the temperature to a high value, so that the problem of transportation method remains unsolved. Further, the quantity is so small that there is a problem of ensuring the quantity.

On the other hand, in the prior art method, as shown in FIG. 1(b), in the surface bed of the sintering packed bed immediately after the bed comes out from the ignition furnace, coke is burned as a result of suction of cold air in the atmosphere to render the temperature low as opposed to the lower bed in which the coke is burned with high-temperature air which has been passed through a high-temperature red heat portion in a sintering progress zone. The upper bed is influenced by the surface bed to inhibit an increase in temperature, which renders melting unsatisfactory due to low temperature, so that the strength of the sintered ore is low. Further, since heat of the upper bed is accumulated in the lower bed, the temperature of the lower bed becomes so high that the meltability is high. As a result, the melting becomes somewhat excessive, and inhibition of air permeation gives rise to uneven burning. For this reason, in crushing and screening, the proportion of fine grains becomes so high that the yield of the product having a size of 5 mm or more is unfavorably lowered.

DISCLOSURE OF THE INVENTION

An object of the present invention is to realize, through focusing on a production process for a sintered ore, a method which enables Zn to be removed from scrap derived from a galvanized steel sheet, which occurs in a relatively large quantity, using as a raw material a chipped light-weight scrap in the production of a molten iron in a blast furnace and the like. Another object of the present invention is to improve the productivity by reducing the amount of coke as a heat source used, suppressing the occurrence of $CO_2$ and $NO_2$ derived from combustion of coke and improving air permeation of the packed bed.

A further object of the present invention is to provide a process for producing a sintered ore, which process enables the yield of the whole sintering bed and the quality to be improved by improving the yield of the upper bed of the sintering packed bed and, at the same time, giving a favorable effect on the sintering in the lower bed.

The subject matter of the present invention is as follows.

(1) A process for producing a sintered ore using an iron scrap as a raw material, characterized by, in the production of a sintered ore using a downward suction sintering machine, either adding an iron scrap to a raw sintering ore to provide a raw mix which is placed on a pallet to form a packed bed or alternatively placing a raw mix of an iron scrap with a raw sintering ore on a pallet to form a packed bed and igniting the surface of the packed bed to effect sintering.

(2) A process for producing a sintered ore using an iron scrap as a raw material according to the above item (1), wherein said scrap contains an iron scrap in a thin debris form having a thickness up to 5 mm and a length of up to 50 mm or an iron scrap in a lump form having a thickness up to 10 mm and a length up to 150 mm.

(3) A process for producing a sintered ore using an iron scrap as a raw material according to the above item (1) or (2), wherein said raw mix of an iron scrap with a raw sintering ore contains an iron scrap in a thin debris or lump form and a flux with the proportion of the flux to the total amount of said iron scrap in a thin debris form and said flux being in the range of from 1 to 30% or the proportion of the flux to the total amount of said iron scrap in a lump form and said flux being in the range of from 30 to 70%.

(4) A process for producing a sintered ore using an iron scrap as a raw material according to any one of the above items (1) to (3), wherein in said packed bed, said raw mix provided by adding an iron scrap to a raw sintering ore contains an iron scrap in an amount up to 100% based on the total amount of the iron scrap and the raw sintering ore and this raw mix is packed on the top surface of a packed bed not containing an iron scrap on said pallet so as to occupy 50% or less of the height of the whole packed bed.

(5) A process for producing a sintered ore using an iron scrap as a raw material according to any one of the above items (1) to (3), wherein in said packed bed, said raw mix provided by adding an iron scrap to a raw sintering ore contains an iron scrap in an amount up to 100% based on the total amount of the iron scrap and the raw sintering ore and this raw mix is packed on the underside of a packed bed not containing an iron scrap on said pallet so as to occupy 50% or less of the height of the whole packed bed.

(6) A process for producing a sintered ore using an iron scrap in a thin debris form as a raw material according to any one of the above items (1) to (5), wherein said iron scrap comprises an iron scrap in a thin debris form having a thickness up to 5 mm and a length up to 50 mm and is mixed in amount of up to 100% based on the total amount of said iron scrap in a thin debris form and said raw sintering ore.

(7) A process for producing a sintered ore using an iron scrap in a lump form as a raw material according to any one of the above items (1) to (5), wherein said iron scrap comprises an iron scrap in a lump form having a thickness up to 10 mm and a length up to 150 mm and is mixed in amount of 70% or less based on the total amount of said iron scrap in a lump form and said raw sintering ore.

(8) A process for producing a sintered ore using an iron scrap as a raw material according to any one of the above items (1) to (7), wherein in the stage of sintering said packed bed, the amount of coke added is increased to provide within the resultant sinter bed such gas atmosphere conditions that the CO to $CO_2$ partial pressure ratio is 0.15 or more.

(9) An iron-scrap-bearing sintered ore characterized by comprising a sintered ore and, present within said sintered ore, 0.5 to 100% of an iron scrap remaining unmelted.

BRIEF DESCRIPTION OF THE DRAWINGS

FIG. 1a and FIG. 1b are explanatory diagrams for a conventional process for producing a sintered ore, wherein FIG. 1a is a schematic flow diagram of a production process for a sintered ore and FIG. 1b is a diagram showing the temperature of the upper and lower beds of the meltability in the section of the sinter bed;

FIG. 8a, FIG. 8b and FIG. 8c are optical photomicrographs of the sintered ore according to the present invention and the conventional sintered ore, wherein FIG. 1a shows the state of scrap remaining in the conventional sintered ore, FIG. 1b shows the state of scrap in sintered ore to which 10% of scrap has been added and FIG. 1c shows the state of the scrap in a sintered ore to which 80% of scrap has been added.

BEST MODE FOR CARRYING OUT THE INVENTION

Figure 1A:
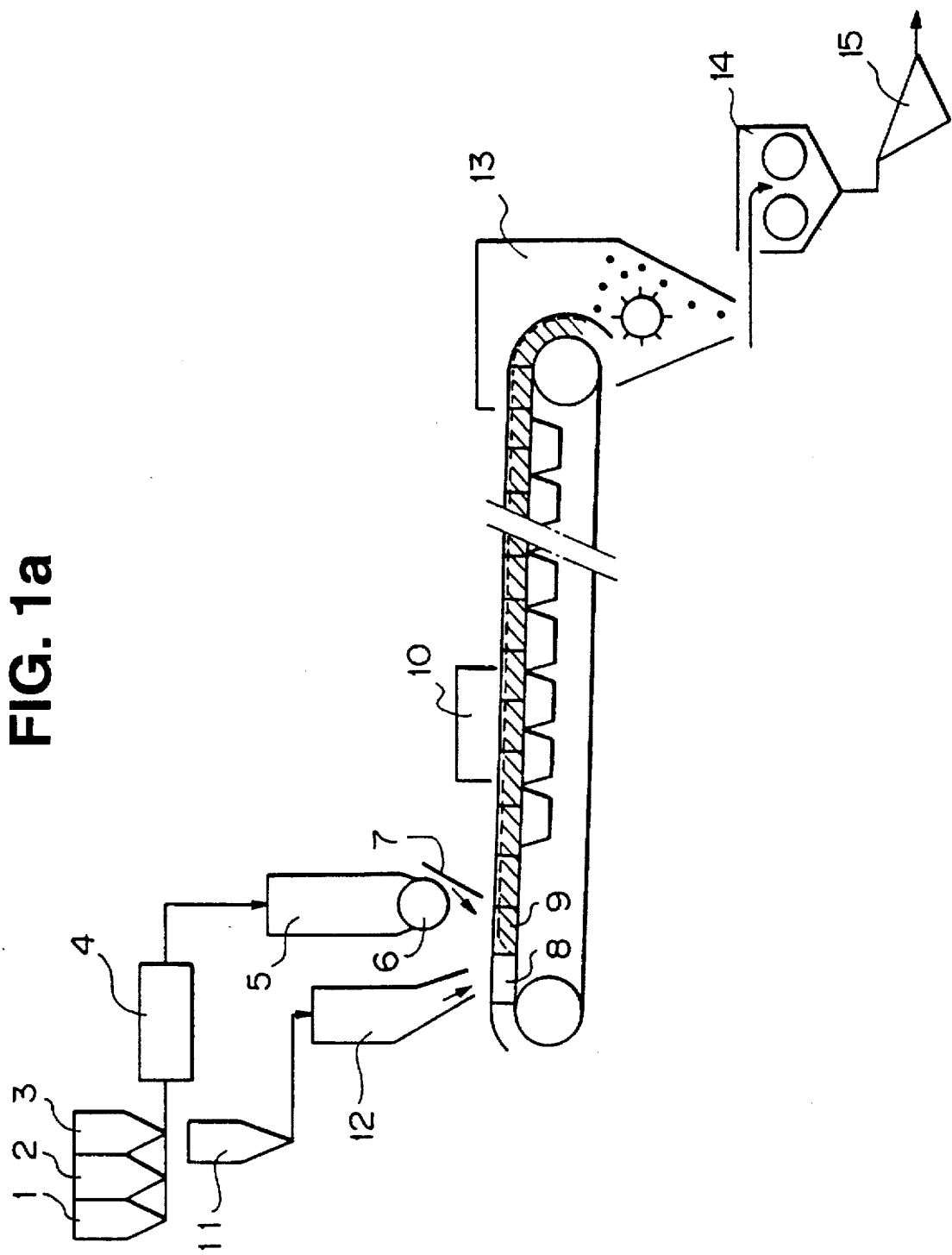

The present invention has been made based on finding that the amount of coke used as a heat source can be remarkably reduced depending upon the degree of generation of heat derived from oxidation of the scrap because scrap is oxidized and generates heat within a sintering bed to raise the temperature of the sintering bed, the occurrence of $CO_2$ and $NO_2$ derived from sintering of the coke is reduced because the amount of coke used can be reduced, the packing density of the packed bed is so small that the permeability of the packed bed to air can be improved to shorten the sintering time, the scrap is fluidized to cause the melt of the scrap to serve as a binder for the sinter of the sintering material, thereby increasing the strength of the sinter without lowering the yield (yield of a product lump having a size of not less than 5 mm) to improve the productivity and, further, when the partial pressure ratio of CO to $CO_2$ of an gas atmosphere within the sintering bed is 0.15 or more, zinc in the scrap can be removed, so that zinc does not migrate into the sintered ore even in the case of use of scrap having a high zinc content and the sintered ore can be produced without leaving zinc in the sintered ore.

According to the present invention, in a process in which an iron ore powder having a size of not more than several mm is sintered and lumped by means of a sintering machine, a scrap having a size of not more than about 50 mm is added and mixed with a raw material comprising an iron ore powder, coke breeze or the like granulated by means of a granulator, such as a drum mixer, during transportation by means of a conveyor and then sintered in a sintering machine. In the present invention, a sintered ore in a lump form containing scrap therein can be produced.

According to the present invention, substantially the whole quantity of the scrap is fixed within the sintered ore in such a form that the scrap is completely melted, partially melted or physically bitten into a sinter of the raw material for the sintered ore, so that a problem of segregation or enrichment in transit to damage a transport belt or to cause clogging in a charge/take-off device between a sintering machine and a blast furnace can be greatly reduced. Further, also in a blast furnace, it is possible to accumulate the sintered ore without causing segregation/enrichment in a particular region in the direction of the section of the furnace. Therefore, scrap can be used in the same manner as conventional sintered ore without an adverse effect on the regulation of the ore bed distribution for controlling the gas flow rate distribution within the blast furnace. Further, the amount of heat fed by coke breeze or the like necessary for sintering the ore powder can be reduced proportionally with the proportion of the scrap used. In addition, when the scrap is distributed on the side of the surface bed in the packed bed on the pallet, the iron scrap develops the function of retaining heat within the sintering bed by virtue of a high thermal conduction of the scrap, which contributes to an improvement in yield of the sinter product. On the other hand, with respect to scrap derived from a galvanized steel sheet, zinc can be easily evaporated by placing the scrap under reducing atmosphere conditions at a high temperature. Since such conditions can be easily formed during sintering of the material for a sintered ore, a sintered ore containing scrap having a low zinc content can be easily produced by mixing the scrap with the raw material for a sintered ore and sintering the mixture.

In general, a raw material comprising various type of iron ore powders having a size of not more than several mm, a coke breeze for sintering the ore powder and a flux for regulating the content of vein stuff in the ore, such as limestone, (hereinafter referred to as a "raw sintering ore") is used in a Dwight-Lloyd sintering machine for the production of a sintered ore for use in a blast furnace.

As is apparent from the flow diagram of FIG. 1(a), the ore powder, the coke breeze and the flux are taken off from an ore hopper 1, a coke breeze hopper 2 and a flux hopper 3, respectively. Then, in a granulator 4, water is added thereto, and the mixture is granulated. Thereafter, the resultant granules are fed into a raw material surge hopper 5 located above a sintering machine, once stored therein and then charged through a drum feeder 6 and a chute 7 into a movable pallet 8 at a constant feed rate to form a packed bed 9 on the surface of the pallet. It is a common practice to bring the height of the raw material bed packed on the surface of the pallet to 300 to 600 mm. The packed bed 9 on the surface of the pallet is ignited within an ignition furnace 10 to sinter the raw sintering ore.

In the above sintering machine, in order to prevent seizing of the pallet 8, a sintered ore or an ore grain having a size in the range of from about 8 to 15 mm is charged from a floor covering hopper 11 through a floor covering surge hopper 12 for flooring purposes just on the floor of the pallet 8. The height of the flooring bed is adjusted to about 50 to 70 mm. The rate of movement of the pallet 8 is in the range of from 1 to 4 m/min, and air is sucked by down-draft through ventilating holes in a slit form provided at the bottom of the pallet for the purpose of sintering the iron ore powder. Thus, the ore powder is sintered.

The sintered ore powder, called a "sinter cake," is discharged from a discharge section 13, passed through a crusher 14 and a sieve 15 to regulate the grain size in the range of from about 10 to 50 mm and then charged as a sintered ore into a blast furnace. The Fe content of the sintered ore is in the range of from about 55 to 57%. In recent years, however, since the proportion of the ore powder having an inferior quality is increased, there is a tendency that the Fe content falls. For this reason, the incorporation of scrap is also effective from the viewpoint of enhancing the Fe content of the sintered ore product.

The term "iron scrap in a thin debris form" and "iron scrap in a lump form" are intended to mean fragments produced by cutting industrial wastes such as cans for foods and beverages, iron sheets from scrapped vehicles, scrapped electrical appliances and iron in a fine debris form resulting from iron mills. Further, the term "flux" is intended to mean three types of materials, that is, ① a mixture of fine iron ore with fine limestone, fine silica rock and coke breeze (hereinafter referred to as a "binder"), ② a scrap having a thickness up to 1 mm and a side length up to 20 mm (hereinafter referred to as a "scrap chip," and ③ a mixture of a binder with a scrap.

When the surface bed of the packed bed comprising an iron scrap in a thin debris form, a mixture of an iron scrap in a thin debris form with a flux or a mixture of a scrap in a lump form with a flux is ignited, heat is generated due to oxidation of the iron scrap in a thin debris form and the scrap as the flux and the heat of combustion of the coke as the flux to melt the scrap. When a flux is added to an iron scrap in a thin debris form and the mixture is sintered, the flux serves as an adhesive, so that sintering can be easily achieved.

The iron scrap in a thin debris form is provided by chopping. It is possible to use a method in which after iron scrap in a thin debris form alone, that is, 100% of the iron scrap in a thin debris form, is charged onto a sintering pallet to form a packed bed, the surface bed of the packed bed is ignited to effect sintering.

The grain size of the binder is preferably not larger than 3 mm. This is because when it exceeds 3 mm, since heat is not transferred to the center of the grain, the binder is less likely to melt, so that the binder does not serve as the adhesive.

The proportion of flux mixed [that is, flux/(flux+ iron scrap in thin debris form)] varies depending upon the size of the iron scrap in a thin debris form.

It is preferred for the iron scrap in a thin debris form to have a thickness up to 5 mm and a side length up to 50 mm from the viewpoint of heat transfer. When the size of the iron scrap in a thin debris form exceeds the above values, the sintering becomes unstable. There is no limitation on the lower limit of the size of the iron scrap in a thin debris form, and the heat transfer and meltability become better the smaller the size of the iron scrap.

The heat transfer becomes poor and the meltability becomes uneven when with increasing the amount of large iron scrap increases in a thin debris form having a size close to the maximum thickness of 5 mm and the maximum side length 50 mm, so that the proportion of the flux mixed should be increased and is preferably in the range of from 1 to 30%. When the proportion of the flux mix is less than 1%, the melting is unsatisfactory. On the other hand, when the proportion of the flux mix exceeds 30%, the melting becomes excessive.

The size of the iron scrap in a lump form is preferably up to 10 mm in thickness and up to 150 mm in side length from the viewpoint of heat transfer, and scrap having a larger size is cut to the above size.

Since the iron scrap in a lump form is large, the heat transfer is poor and the melting is uneven, so that in the sintering a large amount of a flux should be mixed. The proportion of the flux mixed varies depending upon the size of the iron scrap in a lump form. The heat transfer becomes poor and the meltability becomes uneven with increasing the amount of large iron scrap in a lump form having a size close to the maximum thickness 10 mm and the maximum side length 150 mm, so that the proportion of the flux mixed should be increased and is preferably in the range of from 30 to 70%.

When the proportion of the flux mixed is less than 30%, the melting is unsatisfactory. On the other hand, when the proportion of the flux mixed exceeds 70%, the melting becomes excessive.

There is no limitation on the lower limit of the size of the iron scrap in a lump form, and the heat transfer and meltability become better when the size of the iron scrap is reduced.

Figure 2:
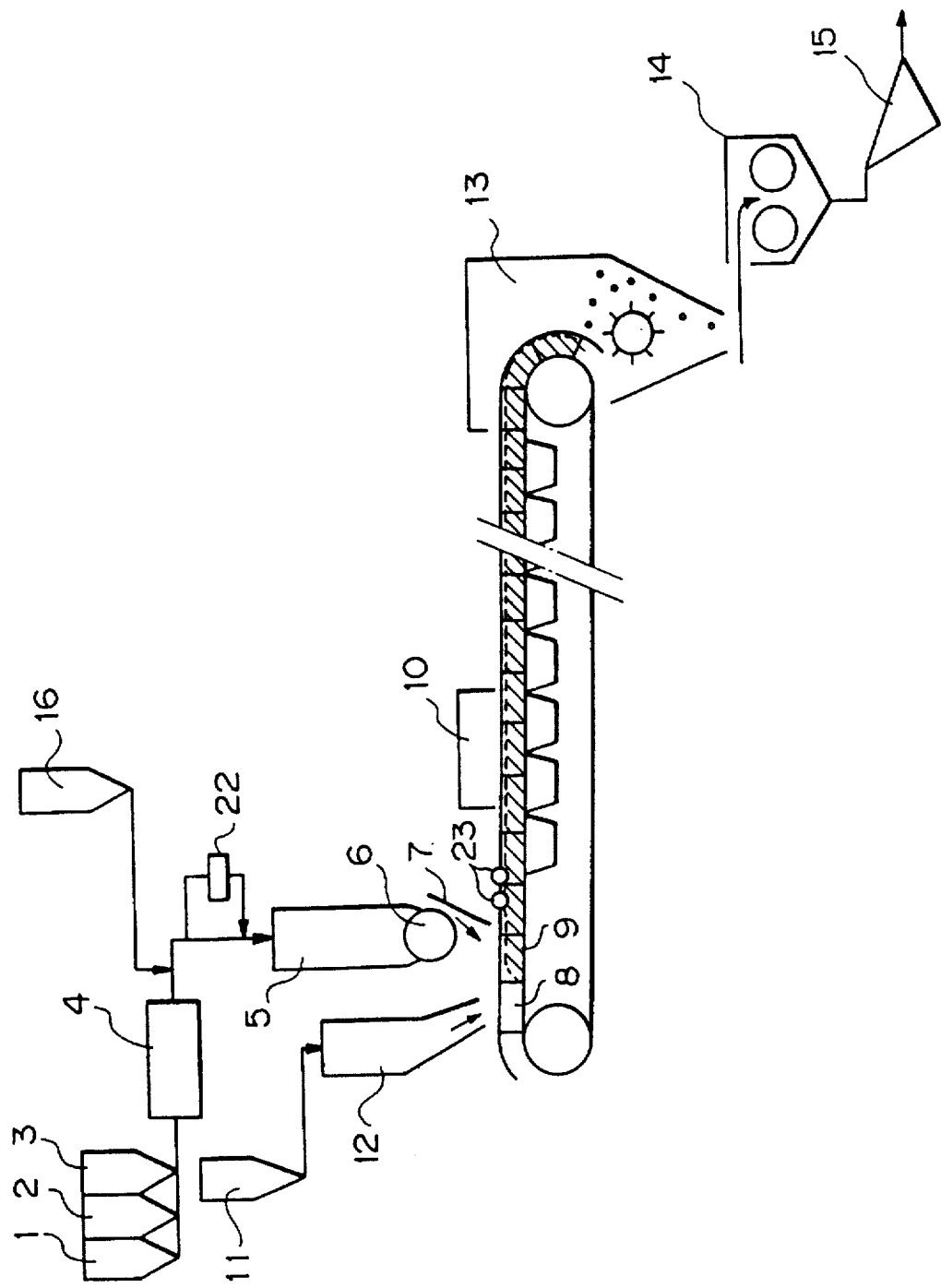
FIG. 2 is a diagram showing the first embodiment of the invention.

As shown in FIG. 2, the scrap is added to the raw sintering ore by taking off the scrap from a scrap hopper 16 in transit on a conveyor in its position behind the granulator 4 for granulating the raw sintering powder and before the raw material surge hopper 5 above the sintering machine. The scrap is added by putting it on the raw sintering material bed on the transport conveyor or alternatively mixed with the raw sintering material by means of a simple mechanical mixer 22 and then charged into the raw material surge hopper 5 above the sintering machine. The scrap is further mixed during take-off of the raw sintering ore from the raw material surge hopper 5.

The raw sintering material may be mixed with the scrap also by feeding a scrap from the iron scrap hopper 16 on the belt conveyor in its portion between the granulator 4 and the flux hopper 3 and mixing the raw sintering material with the scrap in the granulator 4.

Since, however, the specific gravity of the raw sintering ore is different from that of the scrap, when the mixture is charged from the raw material surge hopper 5 onto the pallet 8 of the sintering machine, segregation is likely to occur due to classification, so that a higher proportion of the scrap is generally accumulated on the lower side of the accumulated bed.

Therefore, when a mixture of the raw sintering ore with the scrap is fed through one surge hopper onto the pallet, it is preferred for the scrap to have a size of not larger than 50 mm from the viewpoint of preventing segregation.

Figure 3:
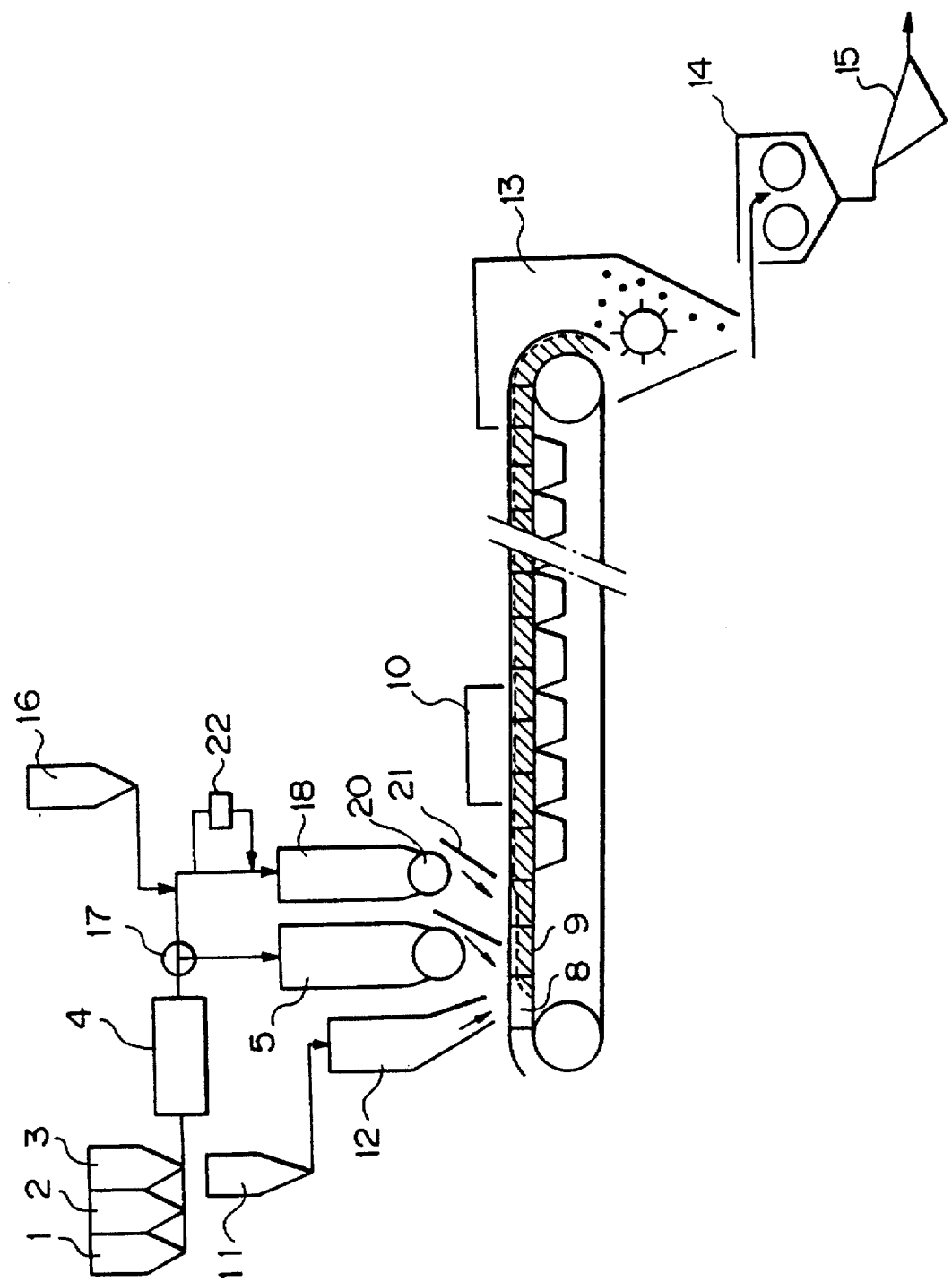
FIG. 3 is a diagram showing the second embodiment of the invention.

As shown in FIG. 3, in order to avoid the segregation phenomenon caused when a scrap having a size in the range of from 50 to 150 mm is used, it is useful to provide, separately from the conventional raw material surge hopper 5, a special purpose surge hopper 18 for charging the mixture of the raw sintering ore with the scrap behind the conventional raw material surge hopper 5. Specifically, the raw sintering ore, which has emerged from the granulator 4, is divided into a portion to be fed into the conventional raw material surge hopper 5 and a portion to be fed into the special purpose surge hopper 18 in a given ratio of the amount in transit on the conveyor by means of a distributor 17, and the scrap is taken off from the scrap hopper 16 and added on the conveyor for transport to the special purpose surge hopper 18.

Thus, when a mixture of a raw sintering ore with a scrap is separately charged through a special purpose surge hopper on the upper side of the packed bed of the raw sintering ore charged from the conventional surge hopper, the distribution of the scrap is limited on the side of the upper bed within the accumulated bed on the pallet and, at the same time, the scrap can be accumulated to a desired thickness. In this case, since the problem of classification and segregation of the scrap on the lower bed of the packed bed on the pallet can be avoided, it is possible to use scrap having a size up to about 150 mm without causing any problem. The thickness of the packed bed to be packed through a special purpose surge hopper on the side of the upper in the packed bed is preferably 50% or less of the overall height of the packed bed.

When the thickness exceeds this value, classification and segregation phenomena of the scrap are develop again and there occurs a problem of the homogeneity of the quality of the sintered ore. Fundamentally, since the scrap need not be melted, it is preferred, also from the viewpoint of reducing the consumption of the coke breeze, for the coke breeze to be packed in a high proportion in the packed bed at its top on which the coke breeze added for the purpose of sintering the ore powder is present in a relatively large amount.

Figure 1B:
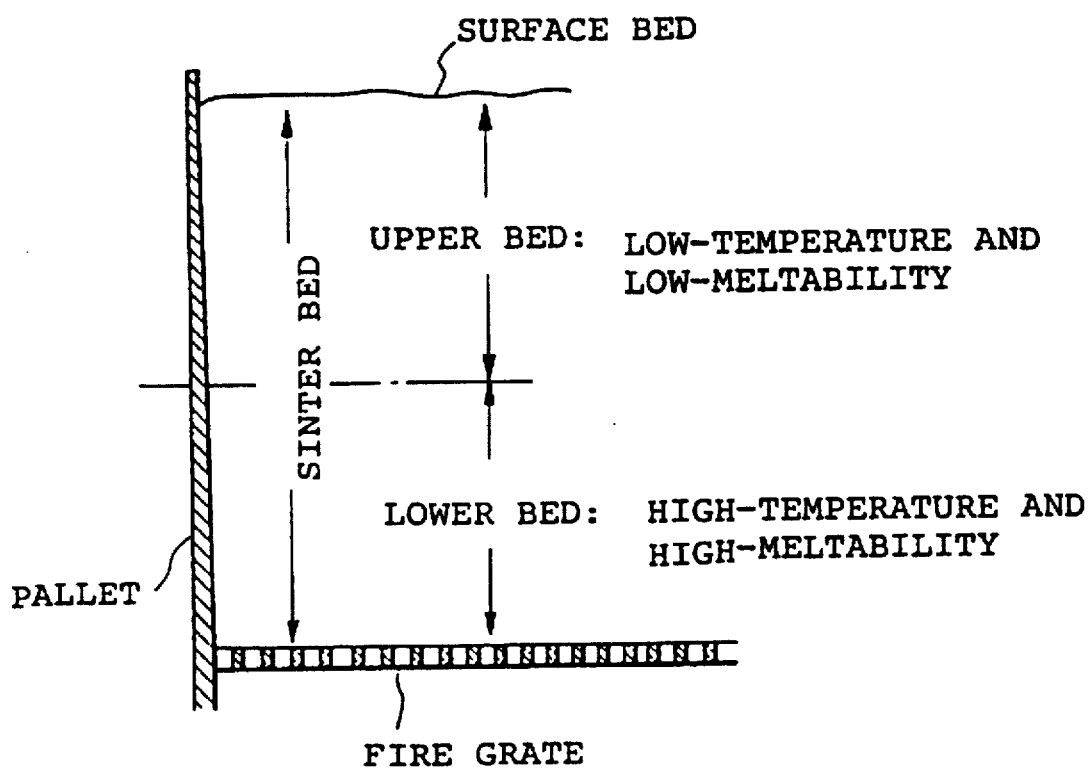

The packed bed of the raw sintering ore on the pallet is transferred into an ignition furnace and ignited with a gas such as COG. In this case, if the scrap is present in a high proportion on the side of the upper bed in the packed bed, it is preheated to serve as a heat retaining medium and further oxidized and generates heat, which causes the scrap to be melted and strongly bonded. For this reason, in the prior art method, since suction of cold air is effected in the sintering process, the temperature of the upper bed in the sinter bed becomes low as shown in FIG. 1($a$), so that the meltability of the sinter bed is unfavorably poor. The process of the present invention can eliminate this problem. Consequently, not only the amount of the coke breeze used can be reduced, but also the yield of the sintered ore product can be improved. It is also possible for the proportion of the scrap charged through the special purpose surge hopper [scrap/ (scrap+raw sintering ore)] to be 100%.

On the other hand, with respect to galvanized scrap debris, in order to practically evaporate zinc contained in the plating, conditions within the sinter bed should be such that the temperature is as high as 1200° C. or above and the partial pressure ratio of CO to $CO_2$ is 0.15 or more. These conditions can be more easily attained within the grain bed containing the coke breeze on the side of the lower bed in the packed bed on the pallet than in the upper bed. For this reason, when zinc is intentionally removed, it is preferred to charge the scrap debris on the side of the lower bed in the packed bed.

Figure 4:
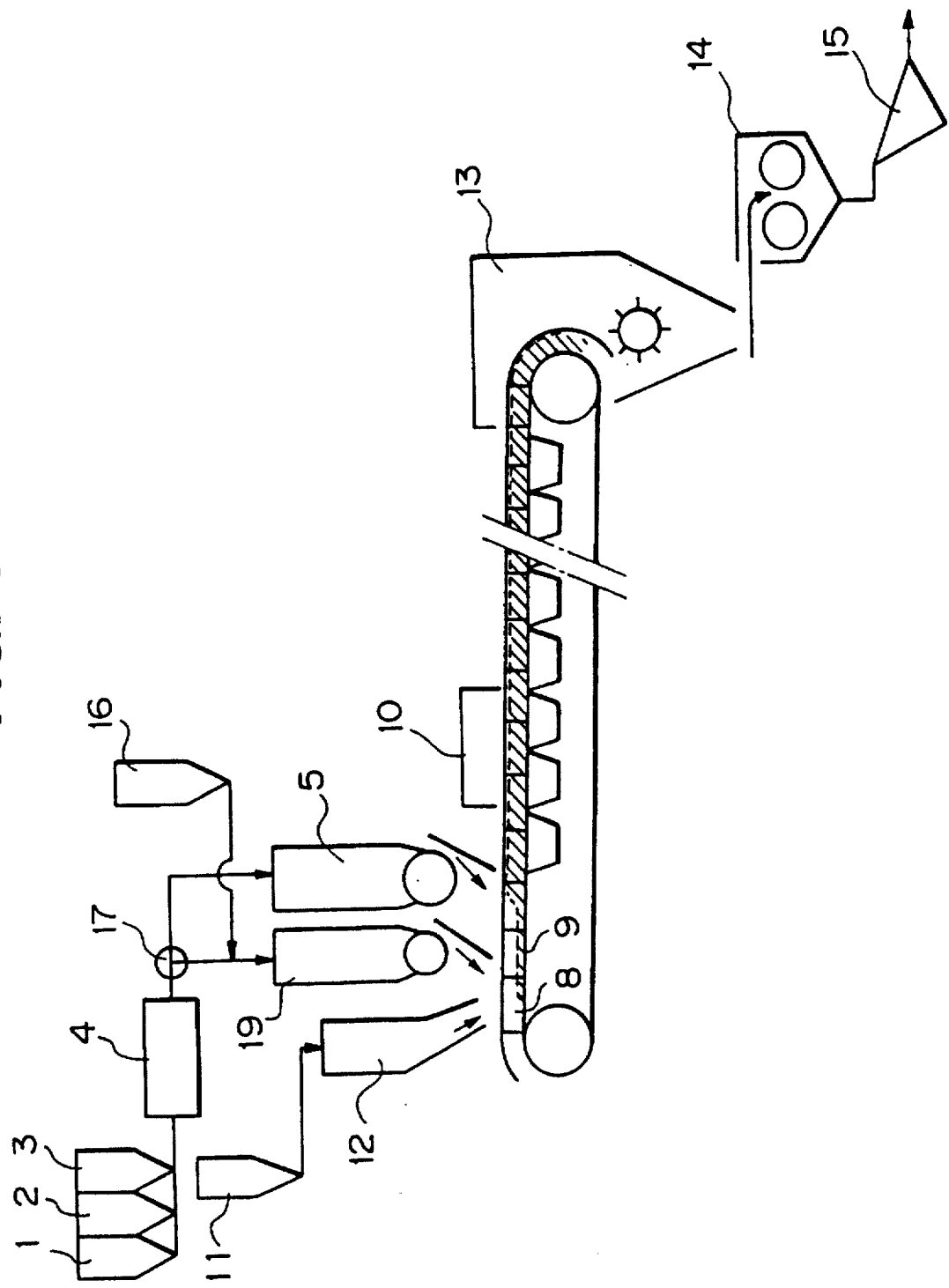
FIG. 4 is a diagram showing the third embodiment of the invention.

Further, in order to intentionally enhance the partial pressure ratio of CO to $CO_2$, it is useful either to increase the amount of the coke breeze added to the raw sintering ore and, at the same time, to increase the proportion of coarse grains or to increase the proportion of the coke breeze present in the surface bed of granulated grains comprising an ore powder in the raw sintering ore. In this case, as shown in FIG. 4, the scrap can be easily packed in a desired lower bed region by providing a special purpose surge hopper 19 for charging a mixture of the raw sintering ore with the scrap onto the conveyor in its portion before the conventional surge hopper 5 (behind the floor covering surge hopper 12). The scrap is added to the raw sintering ore in transit on the conveyor before the raw sintering ore enters the special purpose surge hopper 19 above the sintering machine.

The height of the packed bed (from the surface of the packed floor covering ore) charged through the special purpose surge hopper is preferably not more than 50% of the overall height of the packed bed on the pallet. The proportion of the scrap charged through the special purpose surge hopper to the raw sintering ore [scrap/(scrap+raw sintering ore)] may be 100% or less. The upper limit of the proportion of the scrap mixed [scrap/(scrap+raw sintering material)] varies depending upon the size of the scrap.

The upper limit of the scrap mixed [scrap/(scrap+ raw sintering ore)] varies depending upon the size of the scrap.

Figure 6:
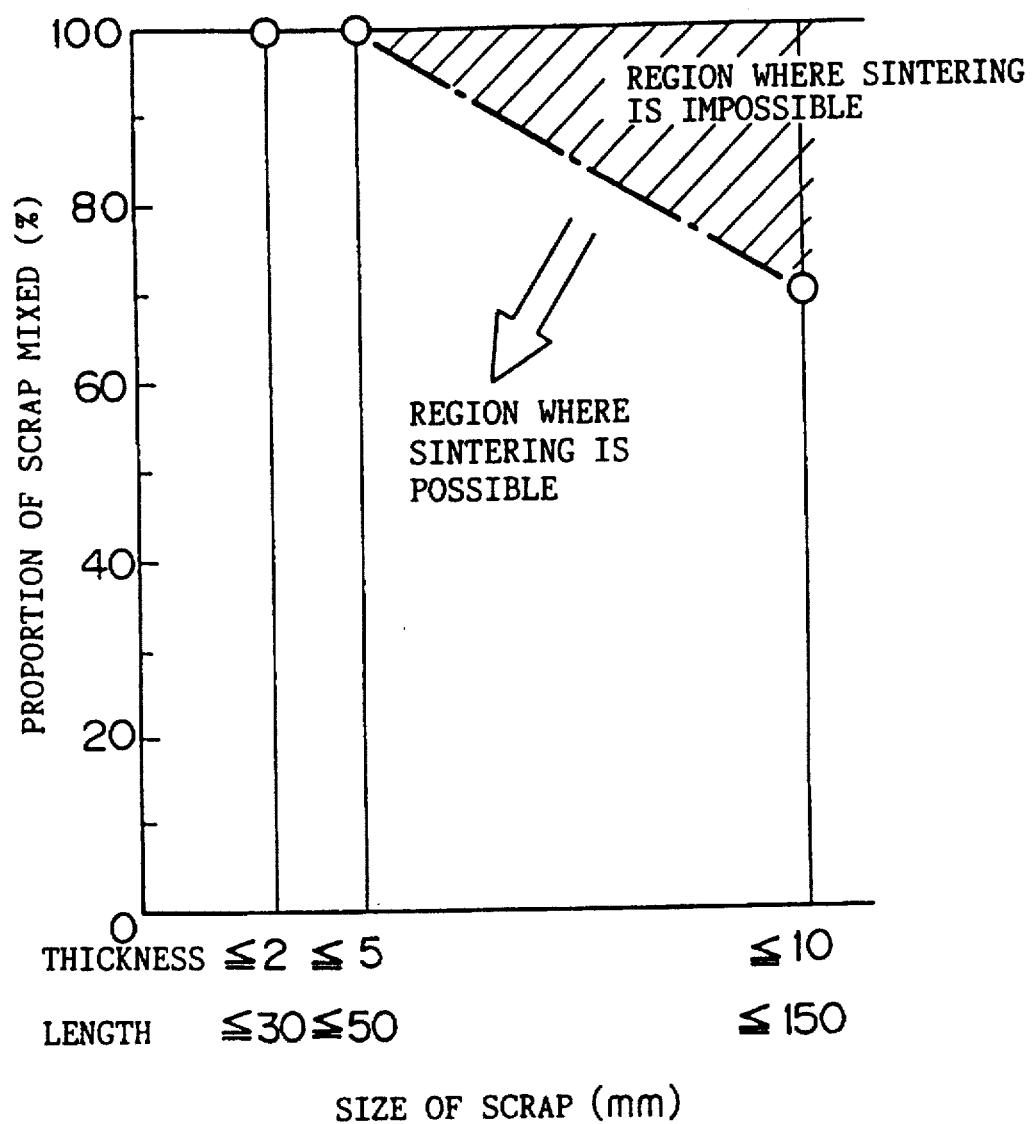
FIG. 6 is a diagram showing a region where sintering is possible, which region has been determined from the relationship between the amount of scrap mixed and the size of scrap.

When the scrap is small and a small iron scrap in a thin debris form having a thickness up to 5 mm and a length up to 50 mm, as shown in FIG. 6, sintering is possible even when the scrap is mixed in a proportion up to 100%.

Figure 7:
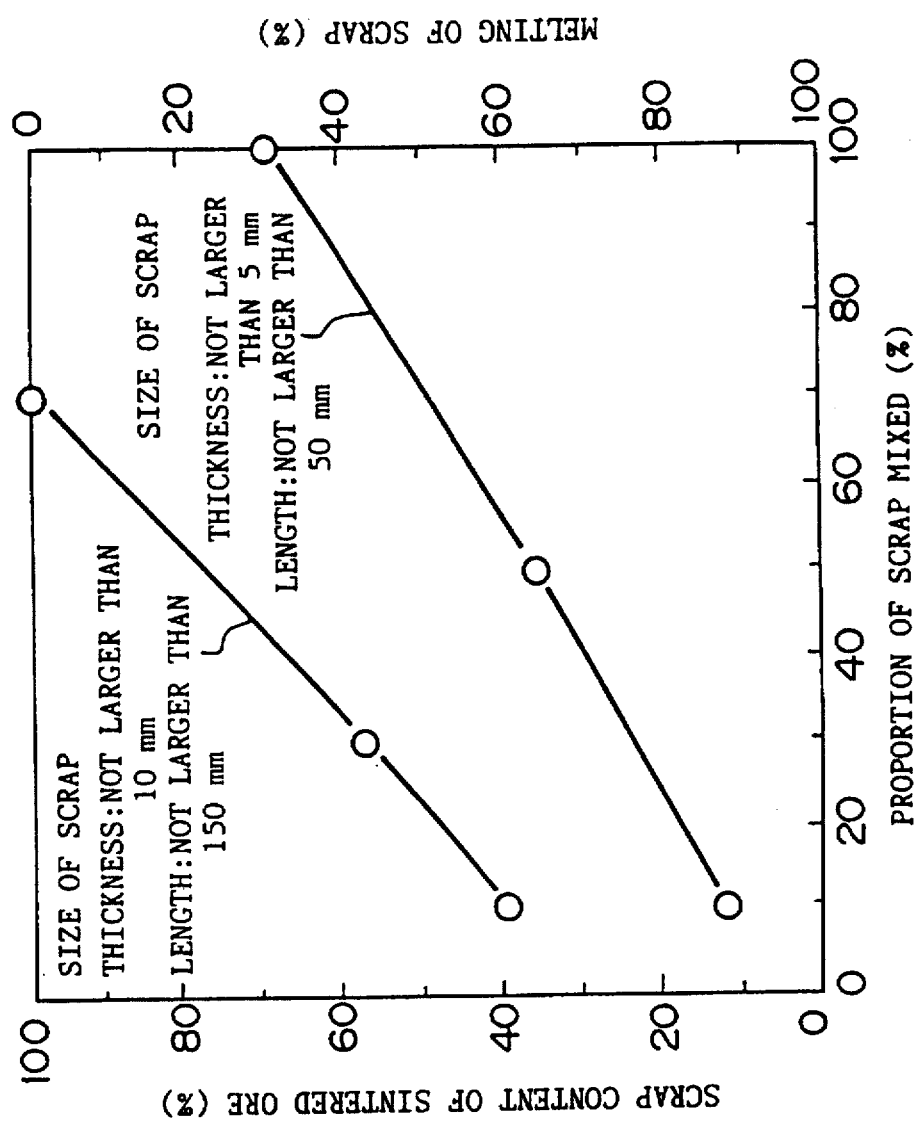
FIG. 7 is a diagram between the scrap content of the sintered ore, the percentage meltability of scrap and the amount of scrap mixed for each size of scrap.

The reason for this is as follows. Since the scrap is small, the packing density of the packed bed does not become very large and heat transfer occurs between scraps. This causes the scrap to be relatively melted, and as shown in FIG. 7, about 30% of the scrap is melted to bring the content of the scrap in the sintered ore to about 70%, which scrap is sintered integrally with the melt of the raw sintering material, so that the strength of the sintered ore can be maintained.

When the scrap is large iron scrap in a lump form having a thickness up to 10 mm and a length up to 150 mm, as shown in FIG. 6, sintering is possible until the proportion of the scrap mixed reaches 70%. Therefore, the proportion of the scrap mixed should be up to 70%.

The reason for this is as follows. Since the scrap is large, the packing density of the packed bed becomes so large that the heat transfer between scraps is unsatisfactory and, as shown in FIG. 7, the percentage melting of the scrap is substantially zero when the proportion of the scrap mixed is about 70%.

In this case, the content of the scrap in the sintered ore becomes about 100%, and the scrap is physically bitten into a melt of the raw sintering material. For this reason, the upper limit of the proportion of the scrap mixed is 70% from the viewpoint of maintaining the strength of the sintered ore.

The present invention will now be described in more detail with reference to the following Examples.

EXAMPLES

Example 1

Scrap A specified in Table 1 was added in a proportion of 10% to a raw material for a sintered ore on a transport conveyor behind a mixer and fed on a pallet through a raw material surge hopper provided above a sintering machine to form a packed bed having a bed thickness of 600 mm, thereby producing a sintered ore.

TABLE 1

| Kind | Size (mm) | Ingredient (%) | | | | |
|---|---|---|---|---|---|---|
| | | C | Cu | Cr | Sn | Zn |
| Scrap A | 5–30 | 1.05 | 0.11 | 0.24 | 0.17 | — |
| Scrap B | 5–50 | 0.47 | 0.06 | 0.15 | 0.10 | — |
| Scrap C | 5–50 | 0.50 | — | — | — | 2.40 |

Grain size, ingredients and quality of the resultant sintered ore are given in Table 2.

A further reduction in coke breeze consumption could be attained as compared with the conventional process where the coke breeze consumption was 50 kg/ton-sinter. Further, the yield could be improved to 84.7%, that is, 6.5% higher than the yield 78.2% obtained in the conventional process shown in FIG. 1. Also with respect to the quality, the cold strength could be improved to 89.3%, that is, 1.2% higher than the cold strength 88.1% obtained in the conventional process.

TABLE 2

| | Grain size of product (mm) | Cold strength [Si] >5 mm (%) | Ingredient (%) | | | | | | Consumption of coke (kg/t-sinter) | Yield of product (%) |
|---|---|---|---|---|---|---|---|---|---|---|
| | | | TFe | SiO$_2$ | Cu | Cr | Sn | Zn | | |
| Ex. 1 | 18.2 | 89.3 | 60.4 | 5.0 | 0.01 | 0.02 | 0.01 | 0.018 | 48.3 | 84.7 |
| Ex. 2 | 20.5 | 91.2 | 60.5 | 5.0 | <0.01 | 0.01 | <0.01 | 0.019 | 47.2 | 85.8 |
| Ex. 3 | 18.5 | 89.5 | 59.1 | 5.3 | — | — | — | 0.020 | 60.5 | 82.7 |

Example 2

A mixture of an iron scrap with a raw material for a sintered ore was charged and packed on the top of a raw material packed bed on a pallet in a sintering machine through a surge hopper separately provided for exclusive use for the mixture. The scrap used was scrap B specified in Table 1, and the mix proportion of the scrap charged through the surge hopper for exclusive use for the mixture was 30%. The scrap was added so that a predetermined weight ratio could be achieved on a transport conveyer in its portion extending from outlet of a pelletizer to the surge hopper for exclusive use for the mixture. The thickness of the packed bed of the mixture comprising the scrap and the raw material for a sintered ore on the pallet was 300 mm, that is, 50% of the total thickness of 600 mm the packed bed.

Grain size, ingredients and quality of the resultant sintered ore are given in Table 2. In addition to a reduction in coke breeze consumption, a 7.6% improvement in sinter yield, to 85.8%, could be attained over the yield 78.2% obtained in the conventional process shown in FIG. 1. This effect is derived from the fact that the scrap is distributed in a higher proportion on the side of the sinter bed on the pallet and hence serves as a heat retaining medium. Also with respect to the quality, the cold strength could be improved to 91.2%, that is, 3.1% higher than the cold strength of 88.1% obtained in the conventional process.

Example 3

A special-purpose surge hopper was separately provided before the conventional surge hopper, and a mixture of fine debris of a scrap with a raw material for a sintered ore was packed through the special-purpose surge hopper into the lower portion of a packed bed on a pallet of a sintering machine. The scrap used was scrap C specified in Table 1, and the mix proportion of the scrap to the raw material for a sintered ore charged through the surge hopper for exclusive use for the mixture was 50%. The scrap was added so that a predetermined weight ratio could be achieved on a transport conveyer in its portion extending from the outlet of a pelletizer to the surge hopper 18 for exclusive use for the mixture. The thickness of the packed bed of the mixture comprising the scrap and the raw material for a sintered ore on the pallet was 300 mm, that is, 50% of the total thickness 600 mm of the packed bed. In the scrap-bearing raw material for a sintered ore, the amount of return fines was increased by 10% by replacing the fresh fine ore with coarse return fine particles to improve the air permeability.

Further, in order to increase the partial pressure ratio of CO to $CO_2$ in the lower portion of the packed bed, the amount of the coke breeze was increased by 20% from that in the conventional process.

Grain size, ingredients and quality of the resultant sintered ore are given in Table 2. The yield could be improved to 82.7%, that is, 4.5% higher than the yield 78.2% obtained in the conventional process. Also with respect to the quality, the cold strength could be improved to 89.5%, that is, 1.4% higher than the cold strength 88.1% obtained in the conventional process.

Further, the scrap can produce a sintered ore having substantially the same zinc content as the sintered ores of Examples 1 and 2 produced by sintering at a high temperature and a high partial pressure ratio of CO to $CO_2$ of 0.15% within the sinter bed.

Example 4

Figure 5:
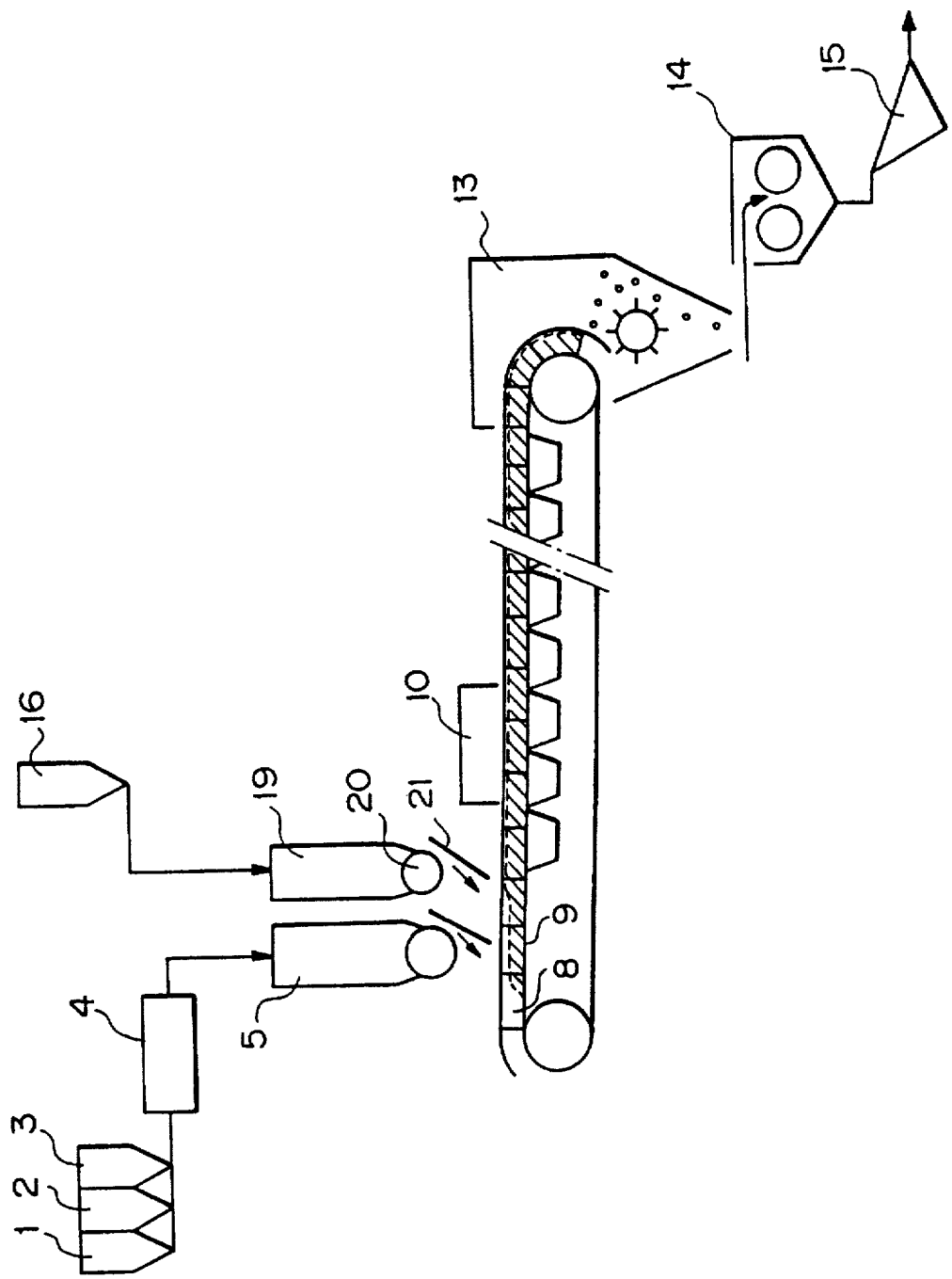
FIG. 5 is a diagram showing the fourth embodiment of the invention.

Example 4 of the present invention is shown in FIG. 5.

A packed bed 9 having a height of 520 mm was formed by the conventional method. A scrap having a maximum thickness of not more than 1 mm and a maximum side length of not more than 30 mm was taken off from a scrap hopper 16, once stored as a scrap material in a scrap surge hopper 19, taken off from a scrap drum feeder 20 and charged through a scrap chute 21 on the surface of the sintering packed bed to form a 100% scrap surface bed having a height of 30 mm. The 100% scrap surface bed in the packed bed was ignited in an ignition furnace 10. Heat derived from oxidation of the scrap was generated, and the coke was burned while sucking the air downward to successively sinter the raw material from the surface bed towards the lower bed by taking advantage of the heat of combustion.

The heat generated by the oxidation of the scrap in the surface bed or the sintering packed bed brought the scrap and the sintering material as the lower bed to a high temperature, which contributed to an improvement in meltability. Consequently, the yield was improved to 84.3%, that is, 6.1% higher than the yield 78.2% obtained in the conventional process shown in FIG. 1.

Example 5

Example 5 of the present invention is shown in FIG. 3.

A raw material having a size of not more than 3 mm for a sintered ore and a scrap having a maximum thickness of not more than 3 mm and a maximum side length of not more than 50 mm were used as a scrap material to be charged onto the surface bed of a sintering packed bed to a thickness of 70 mm. In the scrap material, the proportion of the scrap mixed was 70%.

The raw sintering material having a size of not more than 3 mm was provided by extracting a raw sintering material having a size of not more than 10 mm for a sintered ore immediately after emergence from a mixer 4 and classifying the raw material with a vibrating sieve. On the other hand, the raw material having a size of more than 3 mm to 10 mm for a sintered ore was returned to a belt conveyor in its portion just before the mixer 4 and used to form a packed bed 9 having a height of 480 mm by the conventional method.

The raw sintering material having a size of not more than 3 mm was mixed with a scrap taken off from a scrap hopper 16 in a scrap material mixer 22, once stored as a scrap material in a scrap surge hopper 18, taken off from a scrap drum feeder 20 and charged through a scrap chute 21 onto the packed bed 9 to form a 70 mm-thick surface bed in the sintering packed bed.

The surface bed of the sintering packed bed was ignited in an ignition furnace 11, and the coke was burned while sucking the air downward to successively sinter the raw material from the surface bed towards the lower bed by taking advantage of the heat of combustion.

The heat generated by the oxidation of the scrap and the heat of combustion of the coke in the raw material for a sintered ore brought the surface bed of the sintering packed bed to a high temperature, which contributed to an improvement in meltability. Further, the meltability of the raw sintering material as the lower bed was also improved accompanying the improvement in meltability of the surface bed. Consequently, the yield was improved to 85.6%, 7.4% higher than the yield of 78.2% obtained in the conventional process shown in FIG. 1.

Example 6

Example 6 of the present invention will now be described mainly with reference to a method shown in FIG. 3.

A packed bed 9 having a height of 350 mm was formed by the conventional method. A raw material having a grain size of not more than 10 mm for a sintered ore and a scrap having a maximum thickness of not more than 5 mm and a maximum side length of not more than 50 mm were used as a scrap material to be charged to form a 200 mm-thick surface bed in a sintering packed bed. In the scrap material, the proportion of the scrap mixed was 30%.

The raw sintering material having a grain size of not more than 10 mm was provided by extracting a raw material having a size of not more than 10 mm for a sintered ore immediately after emergence from a mixer 4.

The raw material having a grain size of not more than 10 mm for a sintered ore was mixed with a scrap taken off from a scrap hopper 16 in a scrap material mixer 22, once stored as a scrap material in a scrap surge hopper 18, taken off from a scrap drum feeder 20 and charged through a scrap chute 21 on the packed bed 9 to form a surface bed having a height of 200 mm in the sintering packed bed.

The surface bed of the sintering packed bed was ignited in an ignition furnace 11, and the coke was burned while the air was sucked downward to successively sinter the raw material from the surface bed towards the lower bed by taking advantage of the heat of combustion.

The heat generated by the oxidation of the scrap and the heat of combustion of the coke in the raw material for a sintered ore brought the surface bed of the sintering packed bed to a high temperature, which contributed to an improvement in meltability. Further, the meltability of the raw sintering material as the lower bed was also improved accompanying the improvement in meltability of the surface bed. Consequently, the yield was improved to 83.0%, 4.8% higher than the yield of 78.2% obtained in the conventional process shown in FIG. 1.

Example 7

A raw material taken off from a raw material hopper was subjected to humidity conditioning to a water content of 6.8% and granulated in a mixer 4 in the same manner as the conventional process shown in FIG. 1.

As shown in FIG. 2, a scrap having a thickness of 5 mm and a maximum side length of 50 mm was taken off from a scrap hopper 16 so as to provide a mix proportion of 80% and mixed with a raw material for a sintered ore in a mixer 22.

The scrap-containing raw material for a sintered ore was once charged in a surge hopper 5, taken off from a drum feeder 6 and charged through a chute 7 on a pallet 8 to form a packed bed 9 having a height of 550 mm.

Coke was used in an amount of 1.3% based on the total weight of the coke and the scrap-containing raw material 1 for a sintered ore. This amount is 2.5% smaller than the amount, 3.8%, of the coke used in the conventional process.

The coke in the surface bed of the packed bed 9 was ignited in an ignition furnace 10, and the coke was burned while the air was sucked downward to successively sinter the raw material from the surface bed towards the lower bed by taking advantage of the heat of combustion.

A reduction in amount of the coke used enabled the amount of $CO_2$ generated and the amount of $NO_2$ generated to be reduced by 63% and 61%, respectively. Further, shortening of the sintering time enabled the productivity to be improved to 45.2 t/d/m$^2$, that is, by 12.8 t/d/m$^2$ from the productivity 32.4 t/d/m$^2$ of the conventional process shown in FIG. 1. Also with respect to the quality, the cold strength could be improved to 89.3%, that is, 1.2% higher than the cold strength 88.1% obtained in the conventional process.

Example 8

A raw material taken off from a raw material hopper was subjected to humidity conditioning to a water content of 6.8% and granulated in a mixer 10 in the same manner as the conventional process shown in FIG. 1.

As shown in FIG. 2, a lump scrap having a diameter in the range of from 15 to 30 mm obtained by compressing a scrap having a thickness in the range of from 0.1 to 2 mm was taken off from a scrap hopper 16 so as to provide a mix proportion of 20% and mixed with a raw material for a sintered ore in a mixer 22.

The scrap-containing raw material for a sintered ore was once charged in a surge hopper 5, taken off from a drum feeder 6 and charged through a chute 7 on a pallet 8 to form a packed bed 9 having a height of 550 mm.

Coke was used in an amount of 2.8% based on the total weight of the coke and the scrap-containing raw material 1 for a sintered ore. This amount is 1.0% less than the amount, 3.8%, of the coke used in the conventional process.

The coke in the surface bed of the packed bed 9 was ignited in an ignition furnace 10, and the coke was burned while the air was sucked downward to successively sinter the raw material from the surface bed towards the lower bed by taking advantage of the heat of combustion.

A reduction in amount of the coke used enabled the amount of $CO_2$ generated and the amount of $NO_2$ generated to be reduced by 22% and 20%, respectively. Further, the shortening of the sintering time enabled the productivity to be improved to 39.8 t/d/m$^2$, that is, by 7.4 t/d/m$^2$ from the productivity 32.4 t/d/m$^2$ of the conventional process shown in FIG. 1.

Example 9

A raw material taken off from a raw material hopper was subjected to humidity conditioning to a water content of 6.8% and granulated in a mixer 4 in the same manner as the conventional process shown in FIG. 1.

The amount of the coke taken off from the coke hopper was 2.0% which was 1.8% less than the amount, 3.8%, used in the conventional process.

As shown in FIG. 2, a square scrap having a thickness in the range of from 0.1 to 1.5 mm and a maximum side length of 30 to 50 mm was taken off from a scrap hopper 16 so as to provide a mix proportion of 40% and mixed with a raw material for a sintered ore in a mixer 22.

The scrap-containing raw material for a sintered ore was once charged in a surge hopper 5, taken off from a drum feeder 6 and charged through a chute 7 on a pallet 8 to form a packed bed 9 having a height of 550 mm.

Coke was used in an amount of 2.0% based on the total weight of the coke and the scrap-containing raw material 1 for a sintered ore. This amount is 1.8% less than the amount 3.8% of the coke used in the conventional process.

The coke in the surface bed of the packed bed 9 was ignited in an ignition furnace 10, and the coke was burned while the air was sucked downward to successively sinter the raw material from the surface bed towards the lower bed by taking advantage of the heat of combustion.

The reduction in amount of the coke used enabled the amount of $CO_2$ generated and the amount of $NO_2$ generated to be reduced by 45% and 43%, respectively. Further, shortening of the sintering time enabled the productivity to be improved to 41.7 t/d/m$^2$, that is, by 9.3 t/d/m$^2$ from the productivity 32.4 t/d/m$^2$ of the conventional process shown in FIG. 1.

Example 10

A raw material taken off from a raw material hopper was subjected to humidity conditioning to a water content of 6.8% and granulated in a mixer 10 in the same manner as the conventional process shown in FIG. 1.

As shown in FIG. 2, a square lump scrap having a maximum length in the range of from 5 to 10 mm obtained by compressing a scrap having a thickness in the range of from 0.5 to 1.5 mm was taken off from a scrap hopper 16 so as to provide a mix proportion of 20% and mixed with a raw material for a sintered ore in a mixer 22.

The scrap-containing raw material for a sintered ore was once charged in a surge hopper 5, taken off from a drum feeder 6 and charged through a chute 7 on a pallet 8 to form a packed bed 9 having a height of 550 mm.

Coke was used in an amount of 1.6% based on the total weight of the coke and the scrap-containing raw material 1 for a sintered ore. This amount is 2.1% smaller than the amount, 3.8%, of the coke used in the conventional process.

The coke at the surface bed of the packed bed 9 was ignited in an ignition furnace 10, and the coke was burned while the air was sucked downward to successively sinter the raw material from the surface bed towards the lower bed by taking advantage of the heat of combustion.

Heat generated by oxidation of the scrap increased the temperature of the sinter bed, which contributed to a 2.1% reduction in amount of the coke used in the raw material for a sintered ore. The reduction in amount of the coke used enabled the amount of $CO_2$ generated and the amount of $NO_2$ generated to be reduced by 53% and 51%, respectively. Further, this shortened the sintering time, which enabled the productivity to be improved to 43.6 t/d/m$^2$, that is, by 11.2 t/d/m$^2$ from the productivity 32.4 t/d/m$^2$ of the conventional process shown in FIG. 1.

Example 11

In the present example, a flooring hopper 11 shown in FIG. 2 was used as a lump ore hopper, and a lump ore having a size of 10 to 20 mm taken off from the lump ore hopper was once charged into a lump ore surge hopper 12 and charged on a fire grate (not shown) of a pallet to form a bed having a thickness of 30 mm as a floor covering.

An iron scrap in a thin debris form having a maximum thickness of not more than 5 mm and a maximum side length of not more than 50 mm was taken off from a hopper 16 for an iron scrap hopper in a thin debris form, once charged directly into a surge hopper 5, taken off from a drum feeder 6 and charged on the pallet 8 through a chute 7 to form a scrap packed bed 9 having a height of 500 mm. In this case, no raw material for a sintered ore was used.

The iron scrap in a thin debris form in the surface bed of the scrap packed bed 9 was heated in an ignition furnace 10, and the iron scrap in a thin debris form was oxidized while sucking the air. The iron scrap in a thin debris form was melted and sintered successively from the upper bed towards the lower bed by taking advantage of heat generated by the oxidation.

Neither $CO_2$ nor $NO_2$ occurred because no coke was used.

Example 12

A raw material taken off from a raw material hopper was subjected to humidity conditioning to a water content of 6.8% and granulated in a mixer 4 in the same manner as the conventional process shown in FIG. 1.

As shown in FIG. 2, a scrap having a thickness of 10 mm and a maximum side length of 150 mm was taken off from a scrap hopper 16 so as to provide a mix proportion of 70% and mixed with a raw material for a sintered ore in a mixer 22.

The scrap-containing raw material for a sintered ore was once charged in a surge hopper 5, taken off from a drum feeder 6 and charged through a chute 7 on a pallet 8 to form a packed bed 9 having a height of 550 mm.

Coke was used in an amount of 1.8% based on the total weight of the coke and the scrap-containing raw material 1 for a sintered ore. This amount is 2.0% less than the amount, 3.8%, of the coke used in the conventional process.

The coke at the surface bed of the packed bed 9 was ignited in an ignition furnace 10, and the coke was burned while the air was sucked downward to successively sinter the raw material from the surface bed towards the lower bed by taking advantage of the heat of combustion.

The reduction in amount of the coke used enabled the amount of $CO_2$ generated and the amount of $NO_2$ generated to be reduced by 50% and 48%, respectively. Further, shortening of the sintering time enabled the productivity to be improved to 43.0 t/d/m$^2$, that is, by 10.6 t/d/m$^2$ from the productivity 32.4 t/d/m$^2$ of the conventional process shown in FIG. 1.

Example 13

A lump ore having a size of 10 to 20 mm taken off from a lump ore hopper 11 was once charged into a lump ore surge hopper 12 and charged on a fire grate (not shown) of a pallet to form a bed having a thickness of 30 mm as a floor covering as in Example 11.

An iron scrap in a thin debris form having a maximum thickness of not more than 3 mm and a maximum side length of not more than 50 mm was taken off from a hopper 16 for an iron scrap hopper in a thin debris form, and a binder having a grain size of not more than 3 mm was taken off from a binder hopper 3. In a mixer 22, water in an amount, based on the binder, of 12% was added, and the scrap and the binder were mixed together.

The binder comprised a mixture comprising 33% of fine iron ore, 58% of powdered limestone, 0.5% of powdered silica rock and 8.5% of coke breeze. The proportion of the binder mixed was 15%, and the balance, i.e., 85% of the blend consisted of the iron scrap in a thin debris form.

The scrap material obtained by mixing the binder with the iron scrap in a thin debris form was once charged into a surge hopper 5, taken off from a drum feeder 6 and charged on the pallet 12 through a chute 7 to form a scrap packed bed 9 having a height of 500 mm.

The iron scrap in a thin debris form at the surface bed of the scrap packed bed was heated in an ignition furnace 10, and the iron scrap in a thin debris form was oxidized while the air was sucked downward to successively melt and sinter the iron scrap in a thin debris form from the upper bed towards the lower bed by taking advantage of heat generated by oxidation and combustion heat of the coke in the binder.

Although coke was mixed in the binder, the amount thereof was so small that the amount of $CO_2$ generated and the amount of $NO_2$ generated were reduced respectively by 62% and 60% as compared with those in the conventional process shown in FIG. 1.

Example 14

A lump ore having a size of 10 to 20 mm taken off from a lump ore hopper 11 was once charged into a lump ore surge hopper 12 and charged on a fire grate of a pallet to form a bed, having a thickness of 30 mm, as a floor covering as in Example 11.

An iron scrap in a thin debris form having a maximum thickness of not more than 3 mm and a maximum side length of not more than 30 mm was taken off from a hopper 16 for an iron scrap hopper in a thin debris form, and a scrap chip as a flux was taken off from a hopper 3. They were mixed together in a mixer 22. The proportion of the scrap chip mixed was 30%, and the balance, i.e., 70% of the blend consisted of the iron scrap in a thin debris form.

The iron scrap in a thin debris form in which the scrap chip had been mixed was once charged into a surge hopper 5, taken off from a drum feeder 6 and charged on the pallet 8 through a chute 7 to form a scrap packed bed having a height of 500 mm.

The scrap chip and the iron scrap in a thin debris form in the surface bed in the scrap packed bed were heated in an ignition furnace 10, and, while the air was sucked downward, the scrap chip and the iron scrap in a thin debris form were successively melted and sintered from the upper bed towards the lower bed by taking advantage of heat generated by the oxidation of the scrap chip and the iron scrap in a thin debris form.

Neither $CO_2$ nor $NO_2$ occurred because no coke was used.

Example 15

A lump ore having a size of 10 to 20 mm taken off from a lump ore hopper 11 was once charged into a lump ore surge hopper 12 and charged on a fire grate of a pallet to form a bed, having a thickness of 30 mm, as a floor covering as in Example 11.

An iron scrap in a thin debris form having a maximum thickness of not more than 3 mm and a maximum side length of not more than 50 mm was taken off from a hopper 16 for an iron scrap hopper in a thin debris form, and a binder having a grain size of not more than 3 mm was taken off from a binder hopper 3. Further, a scrap chip was taken off from a scrap chip hopper 2. In a mixer 22, water in an amount, based on the binder, of 12% was added, and the scrap and the binder were mixed together.

The binder comprised a mixture comprising 31% of fine iron ore, 56% of powdered limestone and 13% of coke breeze. The proportion of the binder mixed and the proportion of the scrap chip mixed were 10% and 15%, respectively, and the balance, i.e., 75% of the mixture consisted of the iron scrap in a thin debris form.

The scrap material to which additives has been added was once charged into a surge hopper 5, taken off from a drum feeder 6 and charged on the pallet 12 through a chute 7 to form a scrap packed bed 9 having a height of 500 mm.

The surface bed portion in the scrap packed bed 9 was heated in an ignition furnace 10, and the iron scrap in a thin debris form was successively melted and sintered from the upper bed towards the lower bed while the air was sucked downward.

Although coke was mixed in the binder, the amount thereof was so small that the amount of $CO_2$ generated and the amount of $NO_2$ generated were reduced respectively by 61% and 58% as compared with those in the conventional process shown in FIG. 1.

Example 16

A lump ore having a size of 10 to 20 mm taken off from a lump ore hopper 11 was once charged into a lump ore surge hopper 12 and charged on a fire grate (not shown) of a pallet to form a bed having a thickness of 30 mm as a floor covering as in Example 11.

A lump scrap having a maximum thickness of not more than 10 mm and a maximum side length of not more than 150 mm was taken off from a lump scrap hopper 16, and a binder having a grain size of not more than 3 mm was taken off from a binder hopper 3. In a mixer 22, water in an amount, based on the binder, of 12% was added, and the scrap and the binder were mixed together.

The binder comprised a mixture comprising 34% of fine iron ore, 60% of powdered limestone, 0.5% of powdered silica rock and 5.5% of coke breeze. The proportion of the binder mixed was 40%, and the balance, i.e., 60% of the mixture, consisted of the lump scrap.

The scrap material in which the binder had been mixed was once charged into a surge hopper 5, taken off from a drum feeder 6 and charged on the pallet 8 through a chute 7 to form a scrap packed bed 9 having a thickness of 530 mm. The packed bed 9 having a thickness of 530 mm was compressed by 30 mm by means of a compression roller 23 to bring the thickness of the packed bed to 500 mm.

The surface bed portion of the packed bed was heated in an ignition furnace 10, and the lump scrap was oxidized while the air was sucked downward to successively melt and sinter the lump scrap from the upper bed to the lower bed by taking advantage of heat generated by oxidation and of the combustion heat of the coke in the binder.

Although coke was mixed in the binder, the amount thereof was so small that the amount of $CO_2$ generated and the amount of $NO_2$ generated were reduced respectively by 40% and 38% as compared with those in the conventional process shown in FIG. 1.

Example 17

A lump ore having a size of 10 to 20 mm taken off from a lump ore hopper 11 was once charged into a lump ore surge hopper 12 and charged on a fire grate of a pallet to form a bed having a thickness of 30 mm as a floor covering as in Example 11.

A lump scrap having a maximum thickness of not more than 5 mm and a maximum side length of not more than 150 mm was taken off from a lump scrap hopper 16, and a scrap chip as a flux was taken off from a scrap chip hopper 3. They were mixed together in a mixer 22.

The proportion of the scrap chip mixed was 30%, and the balance, i.e., 70% of the blend consisted of the lump scrap.

The scrap material in which the scrap chip had been mixed was once charged into a surge hopper 5, taken off from a drum feeder 6 and charged on the pallet 8 through a chute 7 to form a scrap packed bed 9 having a height of 530 mm. The packed bed 9 having a thickness of 530 mm was compressed by 30 mm by means of a compression roller 23 to bring the thickness of the packed bed to 500 mm.

The surface bed portion of the packed bed was heated in an ignition furnace 10, and the lump scrap was oxidized while the air was sucked downward to successively melt and sinter the lump scrap from the upper bed to the lower bed by taking advantage of heat generated by the oxidation of the lump scrap and heat generated by oxidation of the scrap chip.

Neither $CO_2$ nor $NO_2$ occurred because no coke was used.

Example 18

A lump ore having a size of 10 to 20 mm taken off from a lump ore hopper 11 was once charged into a lump ore surge hopper 12 and charged on a fire grate (not shown) of a pallet to form a bed having a thickness of 30 mm as a floor covering as in Example 11.

A scrap of steel cans for beverages was used as a lump scrap. Steel can scrap, which had not been significantly deformed, was taken off from a steel can scrap hopper 16, and a binder having a grain size of not more than 3 mm was taken off from a binder hopper 3. Further, a scrap chip was taken off from a scrap chip hopper 2. In a compression crusher, which has been replaced with the mixer 4, the steel can scrap was subjected to compression crushing and mixed with the scrap chip and the binder while adding 12% of water to the binder.

The binder comprised a mixture comprising 31% of fine iron ore, 56% of powdered limestone and 13% of coke breeze. The proportion of the binder mixed and the proportion of the scrap chip mixed were 15% and 15%, respectively, and the balance, i.e., 70% of the mixture consisted of the steel can scrap as the lump scrap.

The mixture of the compression-crushed lump scrap with additives was charged into a surge hopper 5, taken off from a drum feeder 6 and charged on the pallet 8 through a chute 7 to form a scrap packed bed 9 having a thickness of 550 mm. The packed bed 9 having a thickness of 550 mm was compressed by 50 mm by means of a compression roller 23 to bring the thickness of the packed bed to 500 mm.

The surface bed portion of the packed bed 9 was heated in an ignition furnace 10, and the lump scrap was successively melted and sintered from the upper bed to the lower bed while the air was sucked downward.

Although coke was mixed in the binder, the amount thereof was so small that the amount of $CO_2$ generated and the amount of $NO_2$ generated were reduced respectively by 48% and 46% as compared with those in the conventional process shown in FIG. 1.

Example 19

Figure 8A:
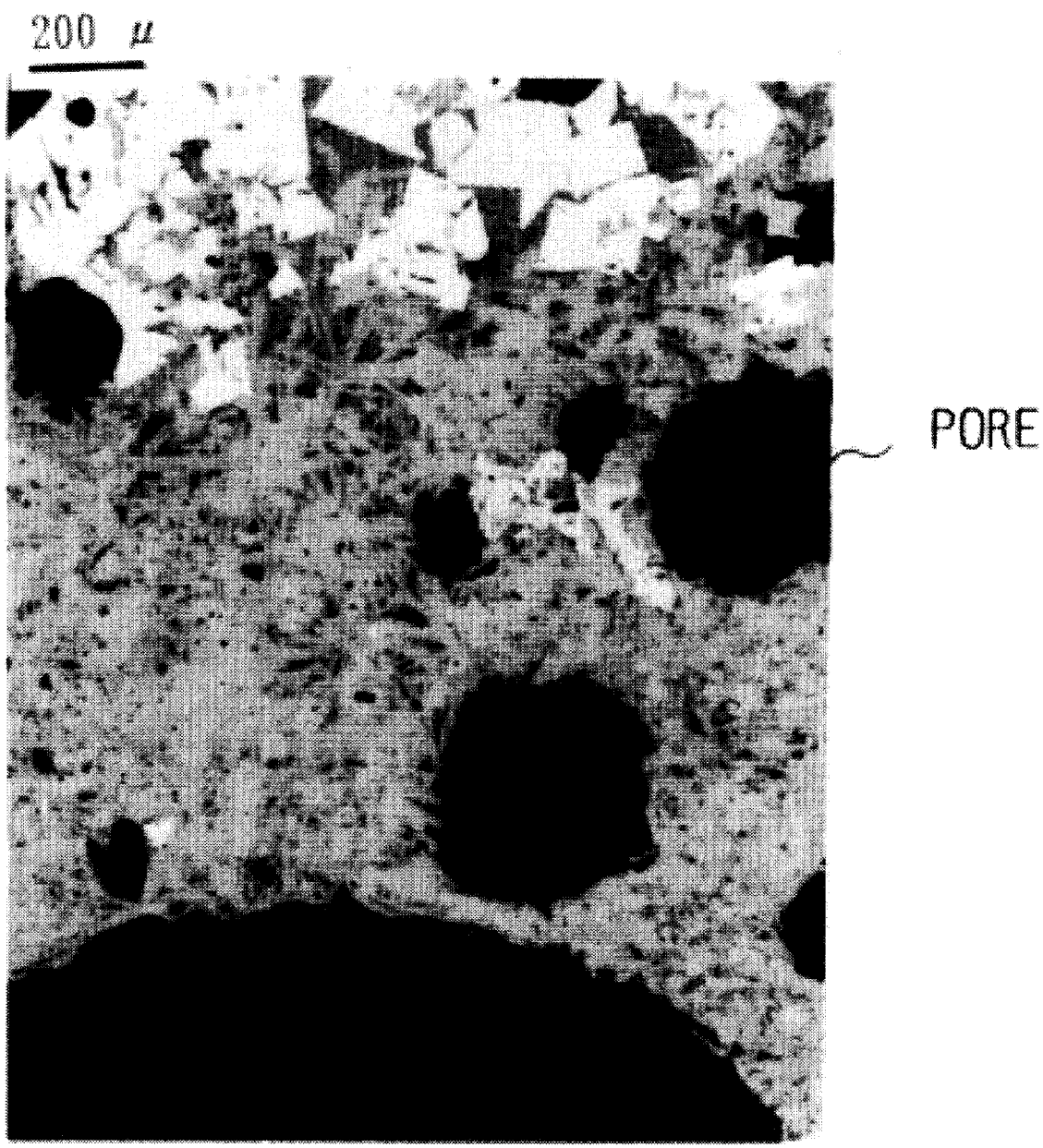
Figure 8C:
Figure 8B:
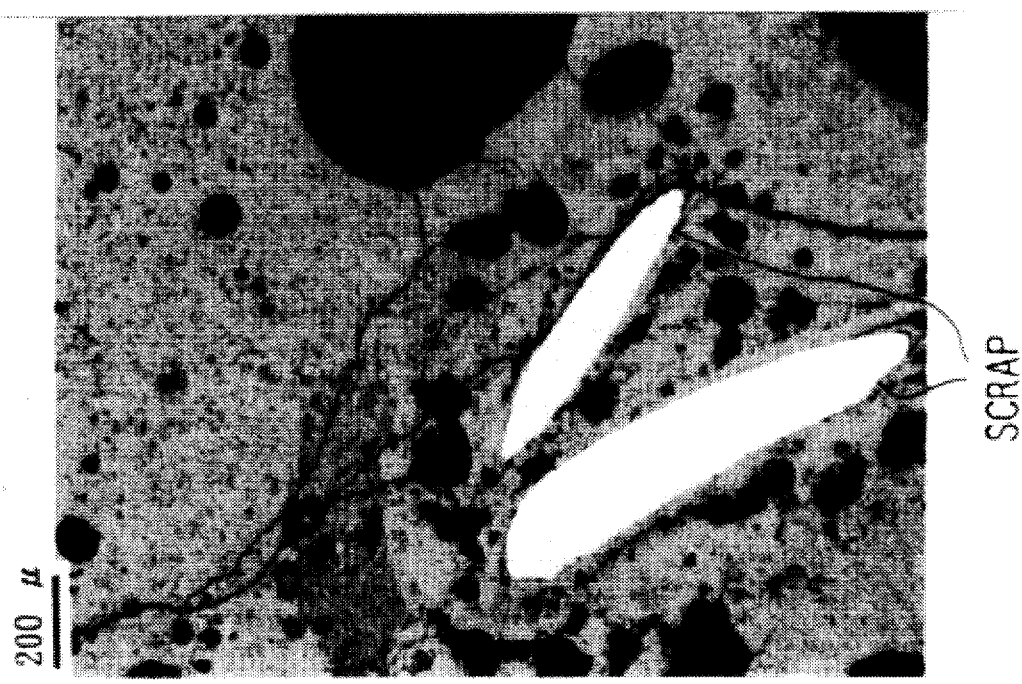

The microstructure in section of the sintered ore produced in Example 1 of the present invention is shown in FIG. 8(b), and the microstructure in section of the sintered ore produced in Example 7 of the present invention is shown in FIG. 8(c). The microstructure of the conventional sintered ore is shown in FIG. 8(a).

As shown in FIG. 8(b), in the sintered ore produced in Example 1, the scrap remained in an amount of 9% in the sintered ore.

Further, as shown in FIG. 8(c), in the sintered ore produced in Example 7, the scrap remained in an amount of 48% in the sintered ore.

Thus, according to the present invention, scrap remains in the resultant sintered ore.

Example 20

Working examples with respect to use of the sintered ore produced in Example 1 of the present invention in a blast furnace are given in Table 3. As is apparent from Table 3, the sintered ore according to the present invention had an improved quality (cold strength) over the sintered ore produced by the conventional process, which contributed to a lowering in coke ratio and a lowering in cost of molten iron. Further, a lowering in molten iron temperature resulted in a lowering in Si content of the molten iron. This contributed to a lowering in cost of removing Si in the steelmaking, so that the cost of steelmaking was lowered.

TABLE 3

|  | Case A | Case B | Comp. Ex. (conventional process) |
|---|---|---|---|
| Proportion of sintered ore used in blast furnace (%) | 20 | 100 | 100 |
| Coke ratio (kg/ton of molten iron) | 495 | 483 | 506 |
| Molten iron temp. | 1513 | 1520 | 1524 |
| Si content of molten iron | 0.32 | 0.36 | 0.41 |

INDUSTRIAL APPLICABILITY

According to the present invention, in ironmaking in a blast furnace, it is possible to use as a raw material a lightweight iron scrap which has been brought to a fine debris form. In particular, it becomes possible to use a large quantity of a scrap derived from a galvanized steel sheet, which scrap occurs in a relatively large quantity. Especially, since the scrap is used in the form of a sintered ore in the blast furnace, problems encountered in transit to the blast furnace or during charging or take-off can be markedly reduced, so that it can be handled in the same manner as the conventional raw material.

Further, since scrap is used as a part of a raw material for a sintered ore, a lowering in a basic unit of coke breeze, an improvement in yield of the sintered ore product or the like can be attained in the production of a sintered ore, which is favorable also from the viewpoint of sintering process. Further, according to the present invention, because heat generated by oxidation of the scrap increases the temperature of the sinter bed, the amount of coke to be used can be reduced. The reduction in amount of the coke used results in a reduction in the amount of $CO_2$ and $NO_2$ generated. Further, the iron content of the sintered ore is so high that a secondary effect of improving the quality of the raw material for ironmaking can be attained.

The following is a list of reference numerals which are used in the drawings:

1 . . . ore hopper,
2 . . . coke breeze hopper,
3 . . . flux hopper,
4 . . . pelletizer (mixer),
5 . . . raw material surge hopper,
6 . . . drum feeder,
7 . . . chute,
8 . . . movable pallet,
9 . . . packed bed on the surface of pallet,
10 . . . ignition furnace,
11 . . . floor covering hopper,
12 . . . floor covering surge hopper,
13 . . . discharge section,
14 . . . crusher,
15 . . . sieve,
16 . . . iron scrap hopper,
17 . . . distributor,
18 . . . special purpose surge hopper,
19 . . . special purpose surge hopper, 20 . . . scrap drum feeder,
21 . . . scrap chute,
22 . . . mixer, and
23 . . . compression roller.

We claim:

1. A process for producing a sintered iron ore product comprising sintered iron ore material and unmelted iron scrap, said process comprising the steps of: in the production of a sintered iron ore using a downward suction sintering machine, either adding an iron scrap to a raw sintering iron ore to provide a raw mix which is placed on a pallet to form a packed bed or alternatively placing a raw mix of an iron scrap with raw sintering iron ore material on a pallet to form a packed bed; and igniting the surface of the packed bed to effect sintering, wherein said raw mix of an iron scrap with a raw sintering iron ore contains an iron scrap in a thin debris or lump form and a flux with the proportion of the flux to the total amount of said iron scrap in a thin debris form and said flux being in the range of from 1 to 30% or the proportion of the flux to the total amount of said iron scrap in a lump form and said flux being in the range of from 30 to 70%, and wherein 0.5 to 100% of said iron scrap remains unmelted during said sintering.

2. A process for producing a sintered iron ore product using iron scrap as a raw material according to claim 1, wherein said scrap contains an iron scrap in a thin debris form having a maximum thickness of not more than 5 mm and a maximum length of not more than 50 mm or an iron scrap in a lump form having a maximum thickness of not more than 10 mm and a length of not more than 150 mm.

3. A process for producing a sintered iron ore product using iron scrap as a raw material according to claim 1, wherein in said packed bed, said raw mix provided by adding an iron scrap to a raw sintering iron ore product in an amount up to 100% based on the total amount of the iron scrap and the raw sintering ore is packed on the top surface of a packed bed not containing an iron scrap on said pallet so as to occupy 50% or less of the total thickness of the packed bed.

4. A process for producing a sintered iron ore product using iron scrap as a raw material according to claim 1, wherein in said packed bed, said raw mix provided by adding an iron scrap to a raw sintering iron ore product in an amount up to 100% based on the total amount of the iron scrap and the raw sintering iron ore product is packed on the underside of a packed bed not containing an iron scrap on said pallet so as to occupy 50% or less of the total thickness of the packed bed.

5. A process for producing a sintered iron ore product using iron scrap in a thin debris form as a raw material according to claim 1, wherein said iron scrap comprises an iron scrap in a thin debris form having a maximum thickness of not more than 5 mm and a maximum length of not more than 50 mm and is mixed in an amount of 100% based on the total amount of said iron scrap in a thin debris form and said raw sintering iron ore product.

6. A process for producing a sintered iron ore product using iron scrap in a lump form as a raw material according to claim 1, wherein said iron scrap comprises an iron scrap in a lump form having a maximum thickness of not more than 10 mm and a maximum length of not more than 150 mm and is mixed in amount of 70% or less based on the total amount of said iron scrap in a lump form and said raw sintering iron ore product.

7. A process for producing a sintered ore using iron scrap as a raw material according to claim 1, wherein in the stage of sintering said packed bed, the amount of coke added is increased to provide within the resultant sinter bed such gas atmosphere conditions that the CO to $CO_2$ partial pressure ratio is 0.15 or more.

* * * * *

UNITED STATES PATENT AND TRADEMARK OFFICE
CERTIFICATE OF CORRECTION

PATENT NO.  : 5,520,719                          Page 1 of 2
DATED       : May 28, 1996
INVENTOR(S) : Yoshio OKUNO, et al.

It is certified that error appears in the above-indentified patent and that said Letters Patent is hereby corrected as shown below:

Column 1, line 41, change "occur" to --occurs--.

Column 1, line 42, change "accumulate" to --accumulates--.

Column 2, line 2, change "more inexpensive" to --less expensive--.

Column 4, line 63, change "an" to --a--.

Column 5, line 41, change "type" to --types--.

Column 8, line 17, after "upper" insert --bed--.

Column 8, line 21, delete "are".

Column 10, line 61, insert --on-- after "mm".

Column 17, line 43, change "has" to --have--.

Column 21, line 34, delete "product".

Column 21, line 36, before "ore" insert --iron--.

UNITED STATES PATENT AND TRADEMARK OFFICE
CERTIFICATE OF CORRECTION

PATENT NO. : 5,520,719
DATED : May 28, 1996
INVENTOR(S) : Yoshio OKUNO, et al.

It is certified that error appears in the above-indentified patent and that said Letters Patent is hereby corrected as shown below:

Column 22, line 20, insert a period after "ore" and delete "product".

Column 22, line 28, insert a period after "ore" and delete "product".

Column 22, line 29, before "ore" insert --iron-- and after "ore" insert --product--.

Signed and Sealed this

Tenth Day of December, 1996

BRUCE LEHMAN

Attest:

Attesting Officer

Commissioner of Patents and Trademarks